Nov. 8, 1932.　　　C. T. PANKHURST　　　1,886,724

OPTICAL LENS

Filed March 28, 1930

INVENTOR.
Charles T. Pankhurst
BY
Geo. P. Kimmel
ATTORNEY.

Patented Nov. 8, 1932

1,886,724

UNITED STATES PATENT OFFICE

CHARLES T. PANKHURST, OF IONIA, MICHIGAN

OPTICAL LENS

Application filed March 28, 1930. Serial No. 439,788.

This invention relates to an optical lens, and the invention has for its object to provide, in a manner as hereinafter set forth, an optical lens having its edge so formed to eliminate the dazzle, glare or diffusion from the edge thereof when the light rays strike the lens, thus materially relieving eye strain.

A further object of the invention resides in the production of an optical lens, in a manner as hereinafter set forth, which when used will make the wearer much less conscious of the presence of the lenses before the eyes.

A further object of the invention resides in the production of an optical lens, in a manner as hereinafter set forth, which will be less conspicuous to anyone looking at the wearer thereof than the form of lens now worn.

A further object of the invention resides in the production of an optical lens, in a manner as hereinafter set forth, whereby the beauty thereof is materially enhanced with respect to the lenses now generally employed.

With the foregoing and other objects in view the invention consists of an optical lens as hereinafter more fully described and illustrated in the accompanying drawing, wherein are shown embodiments of lenses constructed in accordance with this invention, but it is to be understood that changes, variations and modifications can be resorted to which fall within the scope of the invention as claimed.

In the drawing wherein like reference characters denote corresponding parts throughout the several views.

An optical lens in accordance with this invention is produced by taking the stock from which the lens is formed, the stock being of any size, shape or strength and after finishing the front and back surfaces of the stock, in the usual way, that is by grinding to the desired strength and highly polishing both surfaces, the stock is then edged to give it the desired size. After the size has been obtained the edge is given a very high polish, the same as the front and back surfaces of the lens. The edge which is highly polished may be of any desirable contour, but preferably it is slightly rounded.

Figure 1:
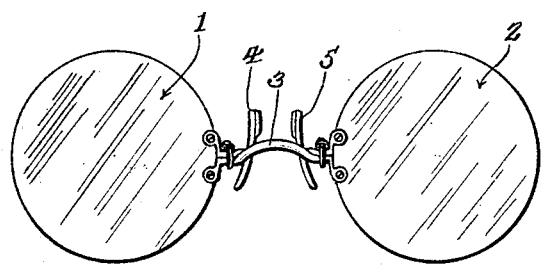
Figure 1 is an elevation of a pair of rimless glasses set up with a pair of lenses in accordance with this invention.

In Figure 1 of the drawing a pair of lenses, constructed in accordance with this invention are designated generally at 1, 2 and which are connected together by a bridge 3 provided with retaining elements 4, 5 engageable with the nose for securing the glasses in wearing position. The structure shown in Figure 1 provides a pair of rimless eyeglasses and with the lenses thereof constructed in accordance with this invention to obtain the advantages referred to.

Figure 2:
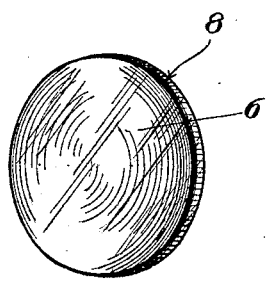
Figure 2 is a perspective view of a lens in accordance with this invention.
Figure 3:
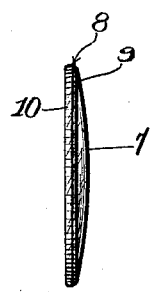
Figure 3 is an edge view thereof.
Figure 4:
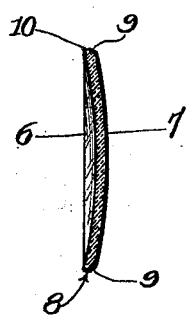
Figure 4 is a vertical sectional view.

Referring to Figures 2, 3 and 4, the highly polished rear face of the lens is indicated at 6, the highly polished front face of the lens is indicated at 7 and the highly polished edge of the lens is indicated generally at 8. The edge 8 is bevelled to have a portion thereof extend forwardly, as at 9 and a portion thereof extending rearwardly, as at 10. It is to be understood however that the edge 8 can be of any desired contour. The form of lens shown in Figures 2, 3 and 4 is employed for rimless glasses.

Figure 5:
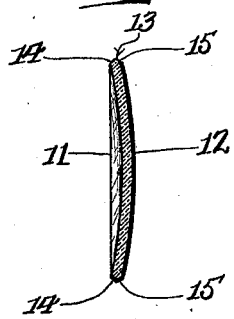
Figure 5 is a vertical sectional view of a modified form of lens in accordance with this invention and of that type which is connected to a rim.

Referring to Figure 5 a lens in accordance with this invention is shown and it is of the form for use for connection to a rim. In Figure 5 the highly polished rear inner face of the lens is indicated at 11, the highly polished outer or forward face at 12 and the edge at 13. The edge is highly polished and its contour can be as desired, but as shown it is bevelled to extend in opposite directions as indicated at 15, 14 with the bevels of equal width.

The edges 8 and 13 are of a high polish and the polish thereof is substantially the same as the rear and forward faces of the lens.

A lens, in accordance with this invention, when used will improve the sight, when placed before the eyes, in case of defective vision. The lens will also materially relieve eye strain, due to the fact that as the edge thereof is highly polished it will provide for the passage of light rays through the lens to eliminate dazzle, glare or diffusion from the edge when light strikes the lens.

As the lens has its edge and both faces highly polished, it is finished to the extent that the appeareance thereof will be materially enhanced with respect to the appearance of lenses now generally employed, then further, owing to the highly polished edge the wearer thereof will be much less conscious of the presence of the lens when before the eye. As the edge of lens is highly finished, it will be much less conspicuous than usual, to anyone looking at the wearer of the lens.

What I claim is:

1. An optical lens having its edge rounded throughout, its front face highly polished throughout, its rear face highly polished throughout, said edge being smooth and highly polished to provide for the immediate passage of light rays through the lens from such edge, thereby eliminating dazzle, glare or diffusion when the light rays strike the edge of the lens.

2. An optical lens having its edge rounded throughout, its front face highly polished throughout, its rear face highly polished throughout, said edge being smooth and highly polished to provide for the immediate passage of light rays through the lens from such edge, thereby eliminating dazzle, glare or diffusion when the light rays strike the edge of the lens, the degree of polish of such edge conforming to the degree of polish of said faces.

In testimony whereof, I affix my signature hereto.

CHARLES T. PANKHURST.